(12) United States Patent
Shimizu

(10) Patent No.: US 9,230,210 B2
(45) Date of Patent: Jan. 5, 2016

(54) INFORMATION PROCESSING APPARATUS AND METHOD FOR OBTAINING A KNOWLEDGE ITEM BASED ON RELATION INFORMATION AND AN ATTRIBUTE OF THE RELATION

(75) Inventor: Tomoyuki Shimizu, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 677 days.

(21) Appl. No.: 13/195,679

(22) Filed: Aug. 1, 2011

(65) Prior Publication Data
US 2012/0054140 A1 Mar. 1, 2012

(30) Foreign Application Priority Data

Aug. 31, 2010 (JP) .................................. 2010-195061

(51) Int. Cl.
*G06F 17/00* (2006.01)
*G06N 5/02* (2006.01)

(52) U.S. Cl.
CPC ........................................ *G06N 5/02* (2013.01)

(58) Field of Classification Search
None
See application file for complete search history.

(56) References Cited

U.S. PATENT DOCUMENTS

| 7,254,569 | B2 * | 8/2007 | Goodman et al. | ..................... 1/1 |
| 7,734,569 | B2 * | 6/2010 | Martin et al. | ........................... 1/1 |
| 2004/0122831 | A1 * | 6/2004 | Ha et al. | ........................ 707/100 |
| 2005/0278368 | A1 * | 12/2005 | Benedikt et al. | ............... 707/101 |
| 2006/0184558 | A1 * | 8/2006 | Martin et al. | .................. 707/101 |
| 2009/0063132 | A1 * | 3/2009 | Miyazaki | ........................... 704/9 |
| 2009/0228918 | A1 * | 9/2009 | Rolff et al. | ........................ 725/34 |
| 2009/0281975 | A1 * | 11/2009 | Atallah | ............................. 706/18 |

(Continued)

FOREIGN PATENT DOCUMENTS

| JP | 2003-228580 | 8/2003 |
| JP | 2008-83927 | 4/2008 |
| JP | 2009251825 A | 10/2009 |

OTHER PUBLICATIONS

Billsus, Daniel, David M. Hilbert, and Dan Maynes-Aminzade. "Improving proactive information systems." Proceedings of the 10th international conference on Intelligent user interfaces. ACM, 2005.*

(Continued)

*Primary Examiner* — Kakali Chaki
*Assistant Examiner* — Daniel Pellett
(74) *Attorney, Agent, or Firm* — Fitzpatrick, Cella, Harper & Scinto

(57) ABSTRACT

There is provided an information processing apparatus for presenting knowledge information that is similar to inputted knowledge information, by using a knowledge system including relation information between a plurality of knowledge information items, the apparatus comprising: an input unit configured to receive first knowledge information, and second knowledge information that is associated with the first knowledge information; a relation acquisition unit configured to acquire first relation information indicating a relation that the first knowledge information has with respect to the second knowledge information, from the knowledge system; a knowledge acquisition unit configured to acquire knowledge information that has the relation indicated by the first relation information with respect to the second knowledge information, from the knowledge system; and an output unit configured to output the knowledge information acquired by the knowledge acquisition unit as knowledge information similar to the first knowledge information.

18 Claims, 8 Drawing Sheets

(56) References Cited

U.S. PATENT DOCUMENTS

2010/0017390 A1* 1/2010 Yamasaki et al. ............ 707/5
2010/0036797 A1* 2/2010 Wong et al. .................. 706/55
2010/0106595 A1* 4/2010 Baugher .................. 705/14.42
2010/0146017 A1   6/2010 Itoh et al.

OTHER PUBLICATIONS

Reiter, Ehud, Chris Mellish, and John Levine. "Automatic generation of technical documentation." Applied Artificial Intelligence an International Journal 9.3 (1995): 259-287.*

* cited by examiner

F I G. 3
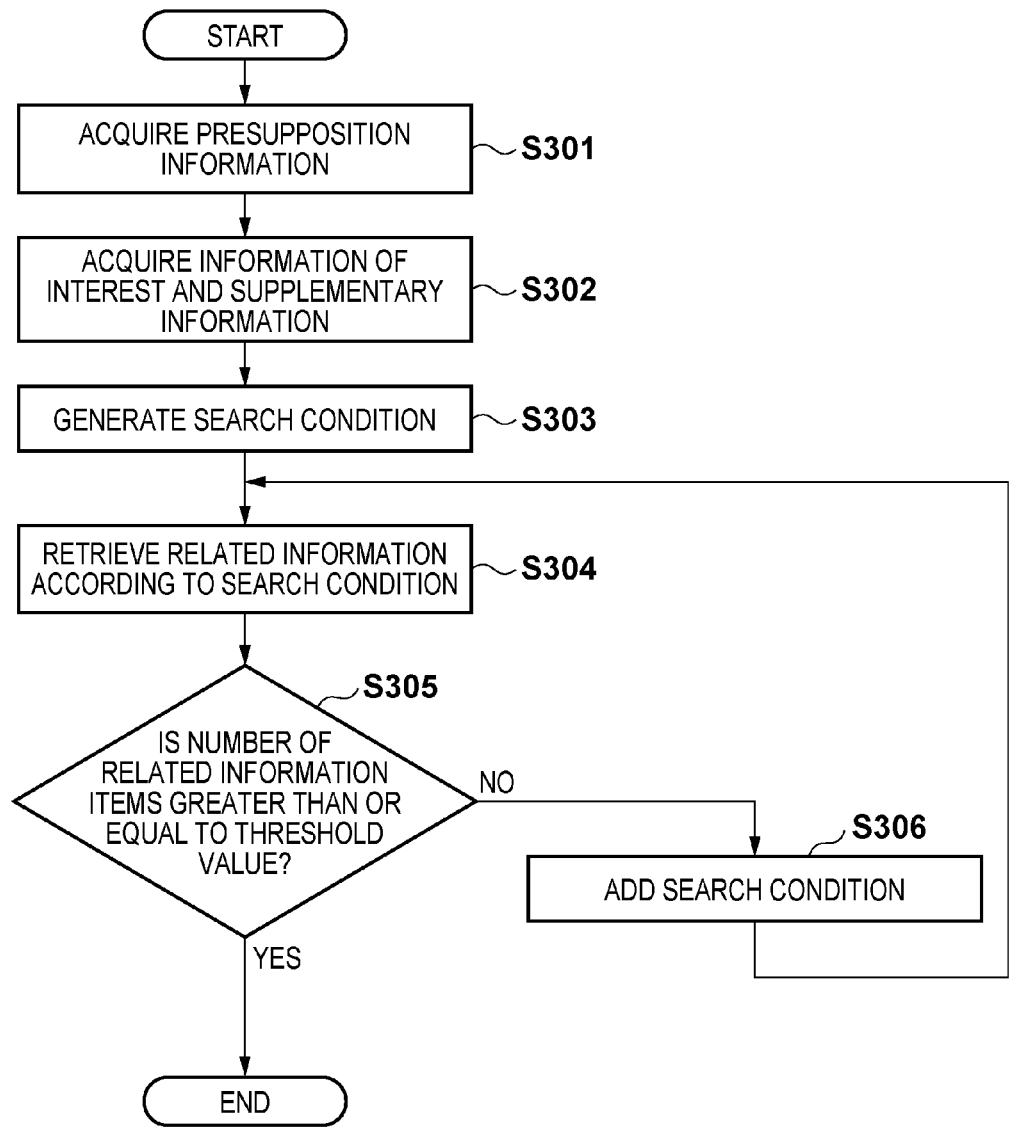

INFORMATION PROCESSING APPARATUS AND METHOD FOR OBTAINING A KNOWLEDGE ITEM BASED ON RELATION INFORMATION AND AN ATTRIBUTE OF THE RELATION

BACKGROUND OF THE INVENTION

1. Field of the Invention

The present invention relates to a technique for presenting content items to a user.

2. Description of the Related Art

A conventional technique is known in which when a user is, for example, producing a document, support is provided to the user for locating required information. For example, there is a categorization technique in which content items having similar features are automatically grouped, thereby facilitating location of desired content items (documents, images and the like) on behalf of the user. As one of the methods for categorizing content items, there is a method in which characteristic amounts indicating the features of content items are extracted, and content items having similar characteristic amounts are grouped. However, with such a categorization method, it may be difficult to determine what feature each content group has. According to the technique disclosed in Japanese Patent Laid-Open No. 2009-251825, keywords are extracted from documents, and the documents are categorized according to the positions of the keywords in the thesaurus.

When a user creates a project proposal for a new project, information or content items that the user needs may be unknown or unfamiliar to the user. In such a case, it is desirable to categorize content items such that the user can find necessary content. However, even if a conventional technique in which content items having similar features are grouped is used, for example, it is difficult to anticipate under what topic the content items have been grouped. When the user is searching for a content item in a field unknown to him or her, the user may not know which content group to search.

With the technique that uses a thesaurus, documents are mapped onto the thesaurus. Accordingly, it is easy to anticipate what feature each content group has. However, with this technique, when documents in an unknown field are searched, it is necessary to determine whether each document corresponds to important information or not, with looking through the thesaurus.

SUMMARY OF THE INVENTION

The present invention enables users to easily retrieve necessary content items.

According to one aspect of the invention, an information processing apparatus for presenting knowledge information that is similar to inputted knowledge information, by using a knowledge system including relation information between a plurality of knowledge information items, comprises: an input unit configured to receive first knowledge information, and second knowledge information that is associated with the first knowledge information; a relation acquisition unit configured to acquire first relation information indicating a relation that the first knowledge information has with respect to the second knowledge information, from the knowledge system; a knowledge acquisition unit configured to acquire knowledge information that has the relation indicated by the first relation information with respect to the second knowledge information, from the knowledge system; and an output unit configured to output the knowledge information acquired by the knowledge acquisition unit as knowledge information similar to the first knowledge information.

According to another aspect of the invention, an information processing method for presenting knowledge information that is similar to inputted knowledge information, by using a knowledge system including relation information between a plurality of knowledge information items, comprises the steps of: receiving first knowledge information, and second knowledge information that is associated with the first knowledge information; acquiring first relation information indicating a relation that the first knowledge information has with respect to the second knowledge information, from the knowledge system; acquiring knowledge information that has the relation indicated by the first relation information with respect to the second knowledge information, from the knowledge system; and outputting the knowledge information acquired by the knowledge acquisition unit as knowledge information similar to the first knowledge information.

According to the above aspects of the invention, users can easily retrieve necessary content items.

Further features of the present invention will become apparent from the following description of exemplary embodiments (with reference to the attached drawings).

BRIEF DESCRIPTION OF THE DRAWINGS

FIG. 3 is a flowchart illustrating processing for obtaining related information, according to Embodiment 1.

DESCRIPTION OF THE EMBODIMENTS

Hereinafter, embodiments of the present invention will be described with reference to the attached drawings. Note that the embodiments described below are to be used, for example, in the following situations. That is, the user is producing electronic document data by using a document production support application that operates on a general-purpose personal computer (PC). The document production support application holds templates for various purposes of documents, such as a tour proposal, report, and the like. After the user selects a template that matches his or her purpose of producing document data, he or she can select a content item to be inserted into the template and input sentences in the template.

At this time, the document production support application can present candidates for content items to be inserted into the template. In order to present these candidate content items, information processing apparatuses according to the embodiments described below are used. That is, the information processing apparatus according to the below-described embodiments categorize and classify the candidate content items, and present the candidate content items to the user via the document production support application. The candidate content items can, for example, be selected according to the input or operation performed by the user.

Note that the embodiments described below illustrate specific implementation examples of the present invention, which are specific examples of the configuration described in the scope of claims.

Embodiment 1

Figure 1:
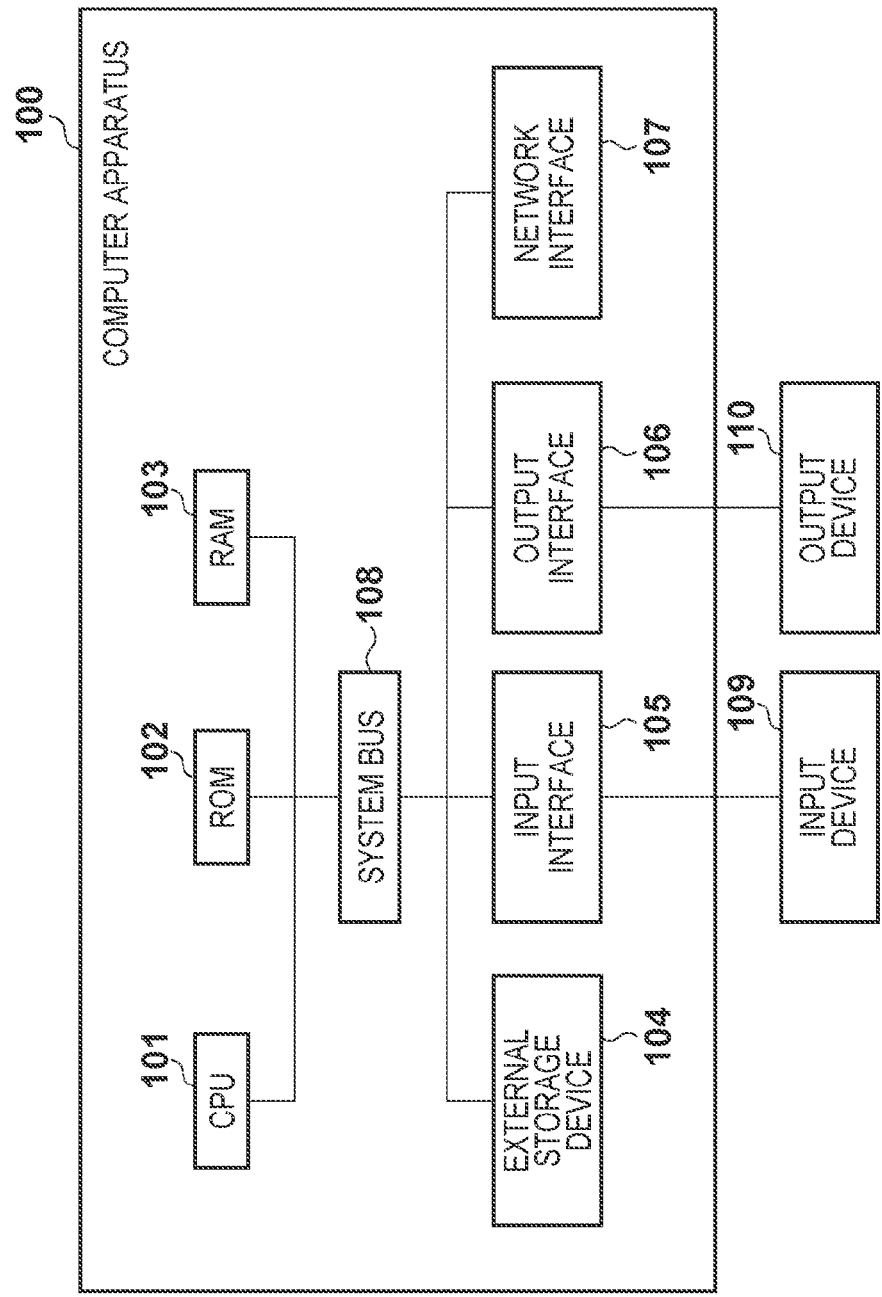
FIG. 1 is a block diagram illustrating an example of the configuration of a computer apparatus according to Embodiment 1.

The circuit configuration of an information processing apparatus according to the present embodiment (categorization presenting apparatus) will be described with reference to the block diagram shown in FIG. 1. The information processing apparatus according to the present embodiment may be an apparatus dedicated to performing the processing of the present embodiment, or may be implemented by using a general-purpose computer apparatus. Also, the information processing apparatus of the present embodiment may be implemented by a single computer apparatus, or may be implemented by distributing its functions to a plurality of computer apparatuses. In cases where the information processing apparatus according to the present embodiment comprises a plurality of computer apparatuses, the computer apparatuses are connected via a local area network (LAN), for example, so as to be able to communicate with each other.

Each unit in a computer apparatus 100 for realizing the processing according to the present embodiment will be described below with reference to FIG. 1. A CPU 101 is a central processing unit for performing overall control of the computer apparatus 100. A ROM 102 is a read only memory for storing programs and parameters that are not to be modified or changed. A RAM 103 is a random access memory for temporarily storing programs and data supplied from an external storage device 104 or the like.

The external storage device 104 is a storage medium for storing programs and data. The external storage device 104 includes a hard disk drive (HDD) and a flash memory drive (SSD) that are built into the computer apparatus 100. Also, the external storage device 104 further includes a memory card and an optical disk capable of being detached from the computer apparatus 100.

An input interface 105 is an interface for connecting the computer apparatus 100 and an input device 109. The input device 109 includes a pointing device, a keyboard and the like. In response to a user operation through the input device 109, data is input via the input interface 105. An output interface 106 is an interface for connecting the computer apparatus 100 and an output device 110. The output device 110 can output data held by the computer apparatus 100, supplied data, or execution results of programs. The output device 110 includes a monitor and the like.

A network interface 107 is an interface for connecting to a network line. The computer apparatus 100 can be connected to a local access network (LAN) via the network interface 107. Also, the computer apparatus 100 can be connected to a wide area network (WAN) via the network interface 107. A system bus 108 connects the above-described elements so they are capable of communicating with each other.

Figure 2:
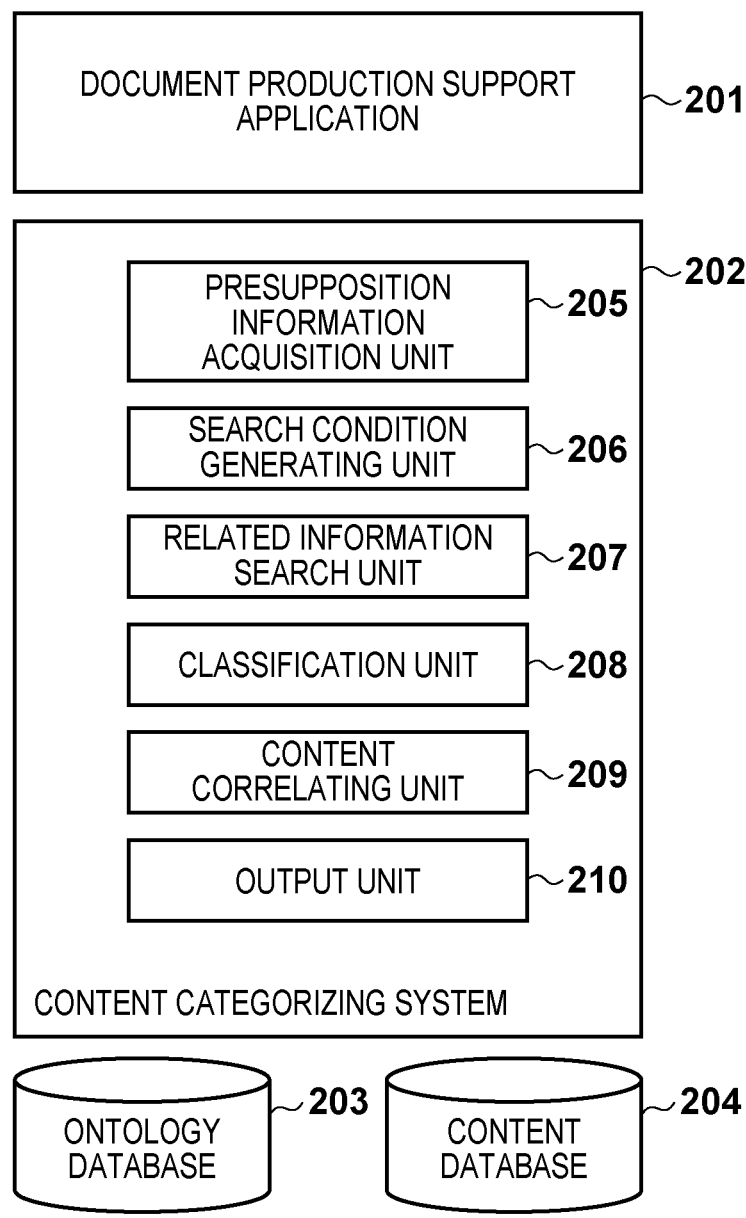
FIG. 2 is a block diagram illustrating an example of the basic configuration of an information processing apparatus according to Embodiment 1.

Next, the basic configuration of the information processing apparatus according to the present embodiment will be described. FIG. 2 is a block diagram illustrating the configuration of the information processing apparatus according to the present embodiment. The configuration shown in FIG. 2 can be realized by one or more computer apparatuses 100, as described above. For example, the configuration in FIG. 2 can be realized by the CPU 101 controlling the elements in the computer apparatus 100 according to the program loaded from the external storage device 104. The information processing apparatus according to the present embodiment includes a content categorizing system 202. Also, the information processing apparatus according to the present embodiment may include a document production support application 201, an ontology database 203 and a content database 204. However, this configuration may be included in an apparatus that is different from the information processing apparatus according to the present embodiment and is connected to the information processing apparatus.

The document production support application 201 supports document production work by the user. The document production support application 201 can acquire a variety of information relating to the document to be produced by the user. Particularly, the document production support application 201 can acquire information indicating the type or the feature of the document to be produced. The document production support application 201 can support document production by the user by using the acquired information. Specifically, the document production support application 201 can acquire input operations made by the user for producing a document via the input interface 105, for example. Also, the document production support application 201 can acquire information from other applications that hold the type or the feature of the document to be produced.

Figure 5:
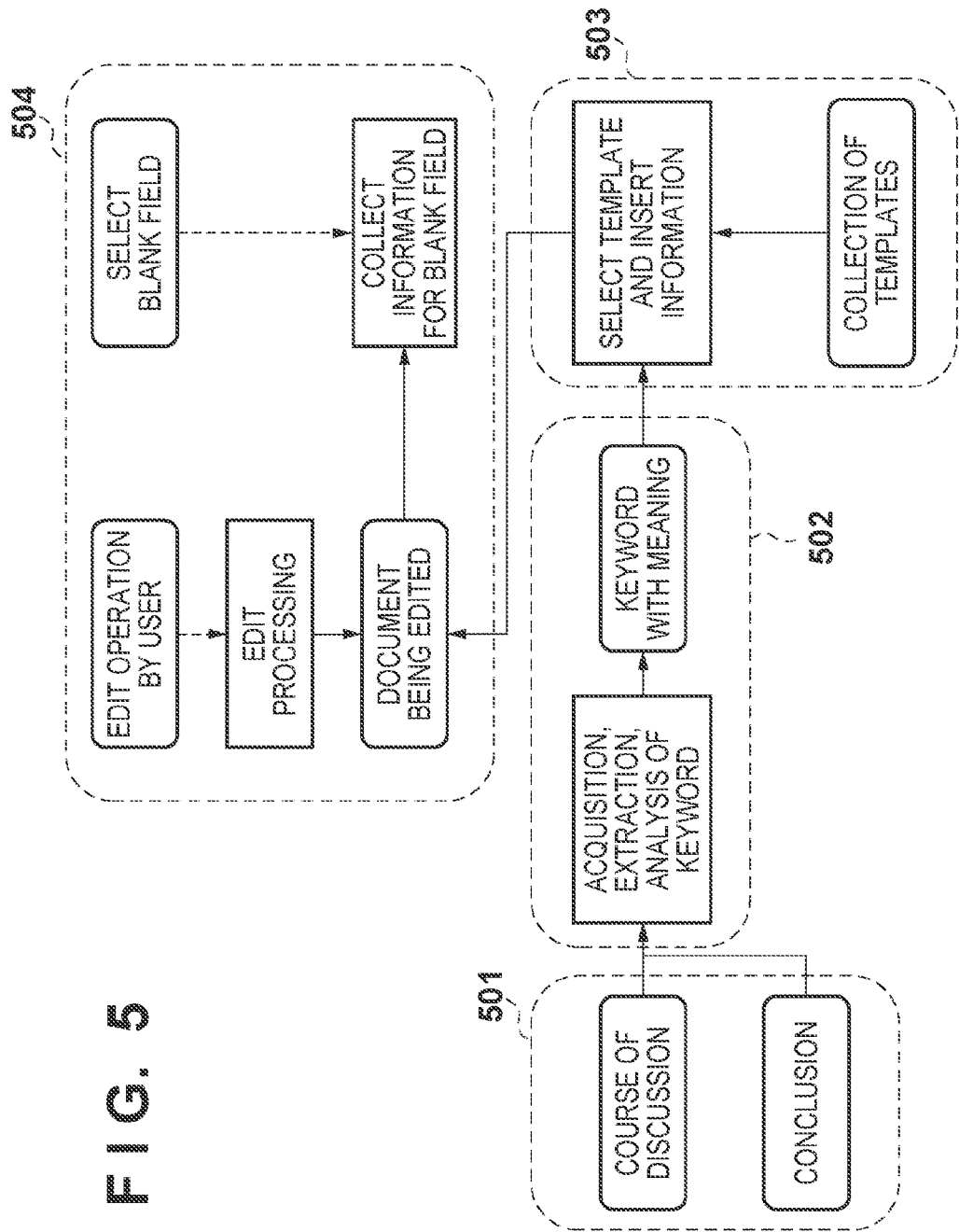
FIG. 5 is a diagram illustrating processing for obtaining information related to documents, according to Embodiment 1.

With reference to FIG. 5, an example will be described below in which the document production support application 201 obtains information relating to the document to be produced by the user. In FIG. 5, rectangles represent processes, and rounded rectangles represent data. Arrows indicate the flow of processing or data, and broken-line arrows indicate processing performed in response to input by the user.

The document production support application 201 according to the present embodiment can support production of various types of documents, and a case will be described below in which the minutes of a meeting are produced. In the example described below, the document production support application 201 may be an application specialized for production of meeting minutes. Also, the document production support application 201 may acquire information from the user indicating that "meeting minutes are to be produced". Moreover, the document production support application 201 may determine that the document to be produced is minutes by analyzing the input by the user.

In the example described below, the document production support application 201 acquires and holds information such as a decision at the meeting (501). This information is input by the user, for example. In this case, it is assumed that the meeting is "a meeting for deciding on a travel project", and the meeting decision is "to make an 'eco-tour' for observing the current situation of 'endangered species' such as a 'Galapagos tortoise' in the 'Galapagos Islands'". In this case, the document production support application 201 can hold data including information such as "produced document: tour proposal", "tour destination: Galapagos Islands", "candidate observation target: Galapagos tortoise", "condition for the candidate observation target: endangered species", "tour purpose: eco-tour" and the like.

Next, the document production support application 201 extracts keywords included in the held information (502). Then, the document production support application 201 selects a template for the document to be produced (503). The document production support application 201 can extract information necessary to select the template. For example, by extracting the information "produced document: tour proposal", which indicates the type of the produced document, the document production support application 201 can select the template for a tour proposal. At this time, for example, by applying an existing document analysis technique to the information held in the form of minutes or the like, the document production support application 201 can extract necessary information, such as which template is to be selected.

Furthermore, the document production support application 201 may insert a content item into the template in advance, according to the held information. For example, the document production support application 201 can insert content items corresponding to the extracted keywords into the template. In this example, it is possible to acquire a content item showing an image of a Galapagos tortoise according to the keyword "Galapagos tortoise", and insert the image into the template. It is also possible for the user to change the inserted content item later. In the present embodiment, the document shown in FIG. 6 is produced by the processing described so far, and displayed to the user.

The user performs edit operations on the selected template (or the selected template into which a content item has been inserted), and the document is completed (504). At this time, the content categorizing system 202 can present content items that can be inserted into the document to the user. For example, the document production support application 201 can send held information, extracted keywords, information input by the user and the like to the content categorizing system 202.

Specifically, the document production support application 201 can acquire text information that the user has inserted into the template, or information indicating the user's action such as selection of the next input place, and send the acquired information to the content categorizing system 202. The content categorizing system 202 can automatically retrieve information that may be useful for the user, by using the sent information. The document production support application 201 receives retrieved information, and presents the information to the user. In this manner, the document production support application 201 can support the information retrieval work at the time of document production.

Figure 6:
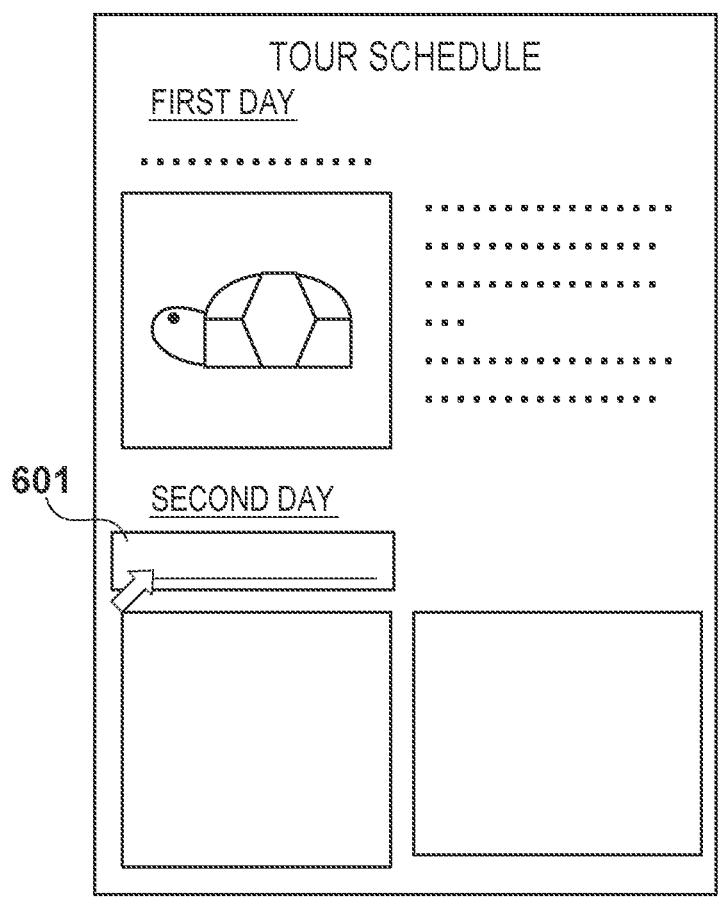
FIG. 6 is a diagram illustrating a state in which the user is selecting a place for making an entry, according to Embodiment 1.

For example, in FIG. 6, a field (601) is selected where the observation target for the second day in the Galapagos Islands is input. In such a case, it is desirable that information such as "Galapagos penguin", "Galapagos albatross" or the like that may be the observation target in the Galapagos Islands is presented to the user. Here, various types of information can be presented to the user. At this time, it is desirable to facilitate selection by the user. In view of this, in the present embodiment, information classified in a tree structure is presented to the user.

For example, it is conceivable that as the subordinate nodes of the category "animal", nodes such as "birds", "mammals" and the like are present, and as the subordinate nodes of the category "birds", nodes such as "Pelecanidae", "Sphenis-cidae", "Diomedeidae" and the like are present. Here, each node in the tree structure corresponds to information (a content item) or a category including one or more information items (content items).

Figure 7A:
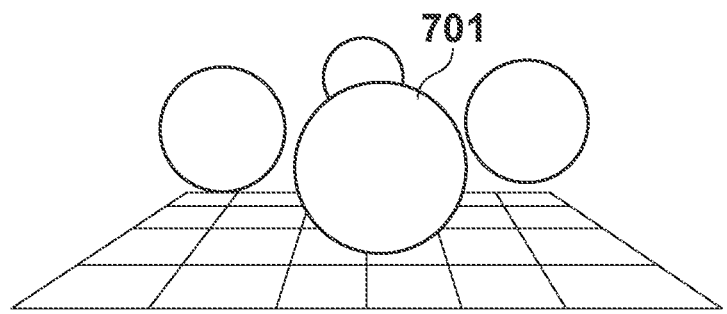
FIGS. 7A to 7C are diagrams illustrating a method for presenting the related information according to Embodiment 1.
Figure 7B:
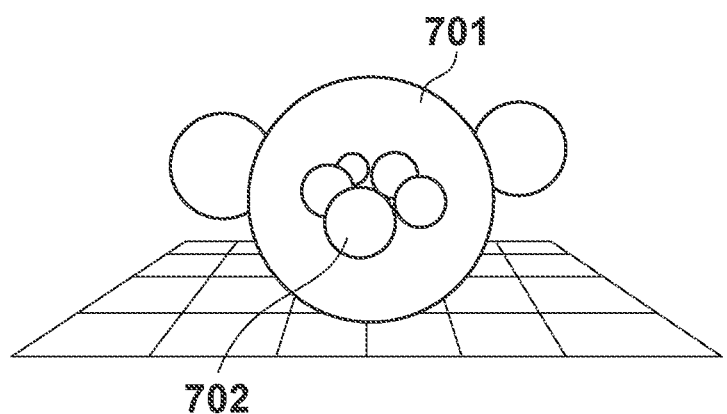
Figure 7C:
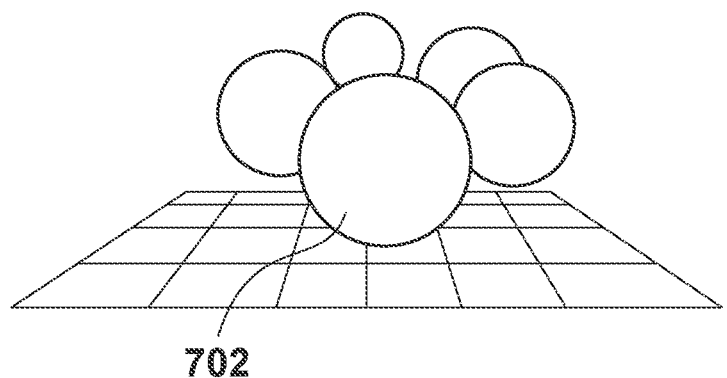

FIGS. 7A to 7C show an example of the method for presenting information classified in a tree structure to the user. In FIGS. 7A to 7C, each node is expressed as a sphere. FIG. 7A indicates nodes subordinate to a certain node. Here, each node may be associated with the content item to be inserted. Also, each node may include a node subordinate thereto. In the spheres representing the respective nodes, information indicating the content items associated thereto can be displayed. For example, the thumbnail of the associated content item may be displayed in each sphere. In the node including one or more nodes subordinate thereto, thumbnails of the content items associated with the one or more nodes may be displayed.

In FIGS. 7A to 7C, the node indicated by a sphere 702 exists as a node subordinate to the node indicated by a sphere 701. In the display of FIG. 7A, if the sphere 701 is selected, for example, if the sphere 701 is focused, nodes subordinate to the node indicated by the sphere 701 are displayed, as shown in FIG. 7C. At this time, when the display of FIG. 7A is changed to the display of FIG. 7C, the hierarchy immediately below the node 701 may be gradually displayed as shown in FIG. 7B. FIG. 7B shows a state in which the sphere 701 is enlarged, and the spheres 702 appear from the inside of the sphere 701.

The content categorizing system 202 can receive information and retrieve information related to the received information. Also, each of the retrieved information may be associated with a content item. Furthermore, the content categorizing system 202 can classify and output the retrieved information. For example, the content categorizing system 202 can receive information from the document production support application 201 and process the information, as described above. In this manner, the content categorizing system 202 can retrieve and output information that may be useful for the user from known knowledge. The known knowledge and details of the content categorizing system 202 will be described later.

The ontology database 203 is a database for storing the known knowledge. The ontology database 203 can store attributes and values of concepts (knowledge information). The ontology database 203 can further store inter-concept relations (relations that certain knowledge information items have with respect to other knowledge information items). These inter-concept relations include abstraction, concretization and equivalent relations. More specifically, the inter-concept relations can indicate a concept in which a certain concept is included. Also, the inter-concept relations indicate a concept that a certain concept includes. Furthermore, inter-concept relations can indicate that a certain concept is the same type as another concept. Also, the ontology database 203 can hold nature or detailed description of concepts by using attributes or values of the concepts. The ontology database 203 can hold the relations that each concept has with respect to other concepts as attributes assigned to the concept. Alternatively, the ontology database 203 may hold a correspondence table of the inter-concept relations, which is held separately from concepts and the attributes thereof.

In the present embodiment, the ontology database 203 holds knowledge described in Resource Description Framework Schema (RDFS)/OWL format. RDFS is standardized by the World Wide Web Consortium (W3C). Also, it is assumed to be possible to retrieve knowledge stored in the ontology database 203 by using SPARQL Protocol and RDF Query Language (SPARQL). SPARQL is a language for describing a query for retrieving knowledge, and is also standardized by the W3C.

In this manner, the ontology database 203 enables the content categorizing system 202 to access knowledge. In this manner, the content categorizing system 202 can know the relation between two information items. In addition, the content categorizing system 202 can retrieve, with respect to certain information, another information item that has a certain relation with the certain information. In the present embodiment, knowledge stored in the ontology database 203 is arbitrary, and for example, it is sufficient if general-purpose knowledge is defined in advance. In addition to general-purpose knowledge, knowledge stored in the ontology database 203 can be defined in various manners according to the difference in knowledge background of the users. The user can, by applying the ontology database he or she is accustomed to, collect or access information by using a system that he or she can easily understand. Also, when the ontology database is systematically classified, collection of or access to information becomes easier, and thus if the ontology database is insufficient, it is recommended to use a better ontology database. The standardized techniques as described above can be applied to the ontology database 203. In this manner, since the ontology database 203 does not require a special configuration, the ontology database 203 will not be described in detail.

The content database 204 manages content items such as documents or images. The content categorizing system 202 can retrieve content items stored in the content database 204. More specifically, with respect to each knowledge item in the ontology database 203, the content categorizing system 202 can retrieve relevant content items from the content database 204. It is also possible that each knowledge item in the ontology database 203 is associated with content items in the content database 204 in advance.

Retrieval of content items can be performed by using the feature of the content items, or metadata attached to the content items, for example. Metadata of the documents includes, for example, "body text", "abstract", "keyword", "title", "production data", "creator" or the like. Also, metadata of images includes, for example, "date of capture", "subject", "capture location" or the like. The content database 204 can also be realized by using a conventional technique. Therefore, the content database 204 will not be described in detail.

Next, the content categorizing system 202 will be described in detail. A presupposition information acquisition unit 205 acquires information from the document production support application 201, as described above. For example, the presupposition information acquisition unit 205 acquires information relating to the document to be produced by using the document production support application 201. The information will be hereinafter referred to as presupposition information. Specifically, this information may include, for example, information held by the document production support application 201, extracted keywords, and information input by the user.

With respect to the above-described example, the information that can be acquired by the presupposition information acquisition unit 205 is, for example, "the user is going to input the observation target for the second day of the itinerary", and "it has been input that the observation target for the first day of the itinerary is a Galapagos tortoise, and the tour destination is the Galapagos Islands". Also, the presupposition information acquisition unit 205 can acquire information held by the document production support application 201, such as "produced document: tour proposal", "tour destination: Galapagos Islands", "candidate observation target: Galapagos tortoise", "condition of candidate observation target: endangered species" and "tour purpose: eco-tour".

A search condition generating unit 206 and a related information search unit 207 retrieve, from the ontology database 203, information related to the information relating to the document that is being produced by using the document production support application 201. In the present embodiment, the search condition generating unit 206 generates a search condition used for searching information in the ontology database 203. Also, the related information search unit 207 acquires information from the ontology database 203 according to the search condition generated by the search condition generating unit 206. Note that the search condition generating unit 206 and the related information search unit 207 may be formed as a single unit.

The search condition generating unit 206 generates a search condition by using the presupposition information acquired by the presupposition information acquisition unit 205 (relation acquisition unit). By searching the ontology database 203 according to the search condition, the related information search unit 207 can acquire information that may be useful for the user. In the present embodiment, the search condition generating unit 206 generates a search condition in the following manner. That is, the search condition generating unit 206 pays attention to "information of interest" (first knowledge information) and "supplementary information" (second knowledge information).

The information of interest is information of the same type as the information that is searched for. The supplementary information is information associated with the information of interest or information associated with the information that is searched for. Said information of interest and supplementary information may be acquired by the presupposition information acquisition unit 205 from the document production support application 201 as part of the presupposition information (input unit). Alternatively, the presupposition information acquisition unit 205 may acquire said information of interest and supplementary information directly from the user. Also, the search condition generating unit 206 may acquire the information of interest and the supplementary information by analyzing the presupposition information that has been input from the document production support application 201 via the presupposition information acquisition unit 205.

The information of interest and the supplementary information will be described in detail below with reference to specific examples. For example, in the above-described example, the user is next trying to enter input into the field for "observation target" for the second day of the itinerary. Therefore, "Galapagos tortoise", which is the "observation target" for the first day of the itinerary may be the information of interest. That is, the information of interest is information serving as an example of the information that the user is trying to input next. Also, the information of interest may be information that is the same type as the information that the user is trying to input next, or information that has the same type of attribute as that of the information that the user is trying to input next. In the case where there are two parallel items in the document, for example, in the case where the item "observation target for the first day" and the item "observation target for the second day" are present in the document, if the user is trying to input one of the items, the other item may be the information of interest.

Also, the presupposition information includes information such as "Galapagos Islands", "endangered species" and "eco-tour". These information items can be considered to be related to the information that the user is trying to input next (e.g., observation target for the second day of the itinerary). Therefore, these information items, for example, information that is not the information of interest among the presupposition information items, can be defined as the supplementary information.

Then, the search condition generating unit 206 acquires the relation (first relation information) between the information of interest and the supplementary information in the known knowledge. For example, the search condition generating unit 206 can acquire the relation between the information of interest and the supplementary information by using the ontology database 203. The relation between the information of interest and the supplementary information will be described in detail below. Here, the information of interest is indicated by "a", and the supplementary information is indicated by "b". In the above example, the information of interest a is "Galapagos tortoise", and the supplementary information b is "Galapagos Islands", "endangered species", "eco-tour" and the like. For the purpose of simplifying the description, in this case, the supplementary information b is assumed to be "Galapagos Islands" only.

By using the known knowledge, the search condition generating unit 206 can acquire the relation between information items. Specifically, in the known knowledge, it is possible to define the relation between a class A, which is an abstract concept of the information a, and a class B, which is an abstract concept of the information b. For example, in the ontology database 203, the relations between the categories (classes) to which information (instances) belongs are defined. By using the relations, the search condition generating unit 206 can know the relation between the information a and the information b. Specifically, it is possible to know that "Galapagos tortoise", which is the information of interest a, and "Galapagos Islands", which is the supplementary information b, have a relation of "habitat".

In the description below, the fact that the information a and the information b have a relation $\alpha$ is expressed as "a→relation $\alpha$→b". In the case where an answer "a→relation $\alpha$→b" is obtained in response to the query about the relation between the information a and the information b to the ontology database 203, the search condition generating unit 206 can know that the information a and the information b have the relation $\alpha$. As described above, in the present embodiment, it is assumed that a query is made by using SPARQL to the ontology database 203 that is constructed by using the RDFS/OWL format. According to the specifications of SPARQL, it is sufficient to produce a query in which the subject is the information a, the object is the information b, and the predicate is a variable. However, it is not necessary for the ontology database 203 to comply with the specifications of RDFS/OWL and SPARQL, as described above. It is sufficient if the relation between the information a and the information b can be known by using the ontology database 203.

The search condition generating unit 206 generates a search condition after having acquired the relation as described above. In the present embodiment, information that has the relation $\alpha$ with the supplementary information b is searched for. Accordingly, the search condition generating unit 206 produces, as a search condition, a query for retrieving such information. For example, in the above-described example, a condition for retrieving unknown information x that satisfies "x→relation $\alpha$→b" is generated. If this is described according to the specifications of SPARQL, the search condition generating unit 206 produces a query in which the object is the information b, the predicate is the relation $\alpha$, and the subject is a variable to be obtained. In this manner, the search condition generating unit 206 generates a condition for retrieving information x that has the relation "habitat" with "Galapagos Islands" from the known knowledge.

In the case where there are a plurality of supplementary information items, the search condition generating unit 206 can generate a plurality of search conditions. For example, if there are two supplementary information items, b1 and b2, the search condition generating unit 206 can acquire a relation $\alpha$1 that satisfies "a→relation $\alpha$1→b1", and produce a search condition for retrieving information x1 that satisfies "x1→relation $\alpha$1→b1". Also, the search condition generating unit 206 can acquire a relation $\alpha$2 that satisfies "a→relation $\alpha$2→b2", and produce a search condition for retrieving information x2 that satisfies "x2→relation $\alpha$2→b2". This also applies to the case in which there are three or more supplementary information items. The relation and the supplementary information used here serve as information that indicates the intention and the reason for focusing on the information of interest. There may be a plurality of intentions and viewpoints for focusing on the information of interest. Also, the relation and the supplementary information are not necessarily in one-to-one correspondence.

In the case where the number of the related information items that have been obtained as a result of the search performed by the related information search unit 207 according to the search condition generated by the search condition generating unit 206 is less than a threshold value, the search condition generating unit 206 can generate another search condition. The threshold value can be designated by the user, for example, as a required number of the related information items. For example, the search condition generating unit 206 can expand the information included in the search condition to a superordinate concept.

Specifically, the search condition generating unit 206 can acquire information b' (third knowledge information), which is a superordinate concept of the supplementary information b, by referencing the known knowledge (expansion unit). For example, the search condition generating unit 206 can acquire, from the ontology database 203, information b' which is indicated by the relation information held by the ontology database 203 to be a superordinate concept of the supplementary information b. Next, the search condition generating unit 206 additionally acquires a relation $\alpha$' that satisfies "a→relation $\alpha$'→b'" (second relation information). Then, the search condition generating unit 206 may generate a search condition for acquiring information x' that satisfies "x'→relation $\alpha$'→b'". Depending on the definition in the known knowledge, the relation $\alpha$' may be the same as the relation $\alpha$. However, also in this case, it may be possible to additionally acquire new information x' by adding the information b', which is a superordinate concept of the supplementary information b, into the search condition.

The related information search unit 207 searches the known knowledge for information that matches the search condition generated by the search condition generating unit 206 (knowledge acquisition unit). Specifically, the related information search unit 207 can reference the ontology database 203. In the present embodiment, the related information search unit 207 acquires information obtained based on the search condition generated by the search condition generating unit 206 as "related information". In the above-described example, the related information search unit 207 searches the ontology database 203 for information x that satisfies "x→relation $\alpha$→b". Then, the related information search unit 207 acquires the retrieved information as the related information. Specifically, the related information search unit 207 searches for information having the relation "habitat" with "Galapagos Islands", and can acquire related information such as "Galapagos penguin", "Galapagos albatross", and the like. In this manner, related information which is information similar to the information of interest can be acquired.

In the case where the related information search unit 207 has acquired a plurality of related information items, a classification unit 208 categorizes and classifies the related information items according to the concept relations and attributes of the known knowledge. In the present embodiment, each related information item is classified in a tree structure. In the present embodiment, hierarchical relation among information items is defined in the ontology database 203. Therefore, each related information item can be classified according to the hierarchical relation defined in the ontology database 203.

For example, assume that "Galapagos albatross" is obtained as related information. In the known knowledge, "Galapagos albatross" can be defined as an instance of a concept hierarchy (class) that indicates the living organism system. For example, "Galapagos albatross" can be defined as an instance in the "bird species" class according to the living organism system. In addition, the "bird species" class can be defined as a concept subordinate to the "animal" class. Furthermore, the "animal" class can be defined as a concept subordinate to the "living organisms" class. The above-described example can be expressed as ""living organisms"→(subordinate concept)→"animals"→(subordinate concept)→"bird species"→(instance)→"Galapagos albatross"".

On the other hand, assume that "crested ibis" is not obtained as the related information. In this case, "crested ibis", which does not exist in the Galapagos Islands, is not obtained as the related information item. Also, since it is a given that there are no amphibian species in the Galapagos Islands, in this case, no information item (instance) that belongs to the "amphibian species" class is obtained as a related information item. In this case, the classification unit 208 may not include the "amphibian species" class in which there is no instance in the related information after classification. In this manner, the classification unit 208 can classify the related information according to the relation in the known knowledge. At this time, the classification unit 208 can remove the class that has no relation to the related information from the related information after classification.

Furthermore, the classification unit 208 may further group related information items by referencing attributes assigned thereto. For example, the classification unit 208 may categorize related information items such that information items having similar attribute values belong to the same group. This categorization may be performed for each class. Specifically, information items that belong to the same class are categorized into several groups. The number of the groups may be set in advance. In this case, the related information items can be categorized into groups such that the number of groups is less than the predetermined number.

A content correlating unit 209 correlates the related information retrieved by the related information search unit 207 with a content item stored in the content database 204. In this manner, the user can acquire a content item related to the related information. Specifically, the content correlating unit 209 can evaluate a relevance degree between the related information and the content item. The related information and the content item may be associated with each other when the relevance degree is a fixed threshold value or more.

The relevance degree can be evaluated in the following manner. For example, when the content item is a document, the relevance degree can be evaluated according to whether the content item includes the related information, for example. As another method, the content correlating unit 209 can determine the relevance degree between the related information and the content item by comparing keywords in the content item with the related information. Keywords can be extracted by analyzing the content item. Various existing techniques can be used in order to extract keywords. For example, keywords can be extracted according to the appearance frequency and distribution of words. In this case, the relevance degree can be evaluated according to whether the keywords match the related information.

It is also possible to evaluate the relevance degree according to whether the meaning of the keyword in the content item is equivalent to the meaning of the related information defined in the known knowledge. Which portion in the known knowledge the related information is obtained from is known in the processes of search and classification. Also, the meaning of the keyword in the content item can be analyzed according to the existing techniques. For example, there is a technique for extracting named entities and their types (personal names, addresses, or the like) from document content. With this technique, it may be possible to determine whether there is a contradiction between the concept to which the related information belongs in the known knowledge and the type of the keyword. If there is no contradiction, the relevance degree between the related information and the content item can be increased. If there is a contradiction, the relevance degree between the related information and the content item can be lowered. In this manner, it is possible to link the related content items and the related information, based on the related information and the concept thereof.

In the case where the content item is not a document, it is possible to evaluate the relevance degree by using the metadata attached to the content item and the attribute thereof. For example, if information "subject: Galapagos penguin" is attached to an image as its metadata, that image can be correlated to the related information item "Galapagos penguin". The related information item and the content item can be associated with each other by an arbitrary method. For example, it is possible to assign a unique related information ID to the related information, and assign a unique content item ID to the content item. In this case, it is possible to manage the relevance degrees by producing a correspondence table that holds related information IDs, content item IDs, and relevance degrees between the related information and the content items. Note that the relevance degrees between the content items and the related information may be determined in advance, and stored.

An output unit 210 outputs related information classified by the classification unit 208 (output unit). Also, the output unit 210 can output the content items associated with the related information at the same time. The output unit 210 may output, for each related information item, information indicating the content items associated with the related information, for example, the above-described content item IDs, instead of outputting the associated content items. In this manner, the output unit 210 can output the related information as knowledge information that is similar to the information of interest, which is presented to the user. By the output unit 210 outputting the related information to the document production support application 201, displays as shown in FIGS. 7A to 7C become possible.

In the case where a plurality of related information items are acquired, the output unit 210 may output the plurality of related information items and information indicating the relation between the related information items (knowledge information items), instead of outputting the related information items classified as in the present embodiment. The information indicating the relation between the plurality of related information items can be acquired by using the ontology database 203, as described above. The document production support application 201 can categorize and classify the related information by acquiring the plurality of related information items and information indicating the relation between the related information items, similar to the classification unit 208. Similarly, the output unit 210 may output attributes assigned to the related information in the ontology database 203. The document production support application 201 can categorize the related information by acquiring the attributes of the related information, similar to the classification unit 208.

Next, processing performed by the content categorizing system 202 in the present embodiment will be described with reference to the flowcharts in FIGS. 3 and 4. The flowchart in FIG. 3 illustrates the procedure for acquiring related information in the present embodiment. In step S301, the presupposition information acquisition unit 205 acquires information relating to a document to be produced, as described above. As described above, the information relating to a document to be produced can be acquired, for example, from the document production support application 201 or via the input interface 105. The content categorizing system 202 holds the acquired information as the presupposition information.

In step S302, the search condition generating unit 206 acquires the information of interest and the supplementary information from the presupposition information acquired in step S301. The number of supplementary information items may be one or two or more. In step S303, the search condition generating unit 206 references the known knowledge and acquires the relation between the information of interest and each supplementary information, as described above. Then, the search condition generating unit 206 generates a search condition for retrieving the related information as described above. As described above, there may be a plurality of supplementary information items. In this case, it is possible to generate a search condition for each supplementary information. Also, there are cases in which a single piece of information of interest and a single supplementary information piece have a plurality of relations. In this case, a search condition can be generated for each relation.

In step S304, the related information search unit 207 retrieves information that matches the search condition generated by the search condition generating unit 206 from the known knowledge, as described above. The content categorizing system 202 holds the retrieved information as the related information. In the case where a plurality of search conditions are generated in step S303, the related information search unit 207 can perform searches by using each of the search conditions. Then, the content categorizing system 202 holds each retrieved information item as the related information.

In this case, the related information search unit 207 may obtain a logical conjunction or a logical disjunction of the related information. Specifically, common information that can be obtained by any of the search conditions may be treated as the related information. Alternatively, information obtained by at least one of the search conditions may be treated as the related information. In the present embodiment, a logical conjunction is obtained for narrowing down the related information items. However, it is also possible to obtain a logical disjunction for acquiring as many related information items as possible.

Also, the number of the related information items may be limited. For example, it is possible to obtain, for each of the retrieved related information items, the number of the search conditions under which the related information can be retrieved. In this case, the information for which the number of such search conditions is greater than or equal to a threshold value can be treated as the related information. Also, a predetermined number of information items selected from the top in the descending order of the number of the search conditions may be treated as the related information. The method for narrowing down the related information may be switchable according to input from the user or setting of the document production support application 201.

In step S305, the related information search unit 207 determines whether the number of related information items obtained in step S304 is greater than a predetermined threshold value. If the number of the related information items is greater than or equal to the threshold value, the processing ends. If the number of the related information items is less than the threshold value, the processing proceeds to step S306. In step S306, the search condition generating unit 206 generates another search condition as described above. For example, the search condition generating unit 206 can expand search conditions such that more related information items can be retrieved, as described above. In the present embodiment, the search condition generating unit 206 references the known knowledge, and sets information that belongs to a concept of a higher hierarchy than that of the existing supplementary information as the additional supplementary information. Then, the search condition generating unit 206 generates an additional search condition for retrieving information that has the relation acquired in step S303 with the additional supplementary information. Thereafter, the processing returns to step S304, and the related information is retrieved under the additional search condition.

Figure 4:
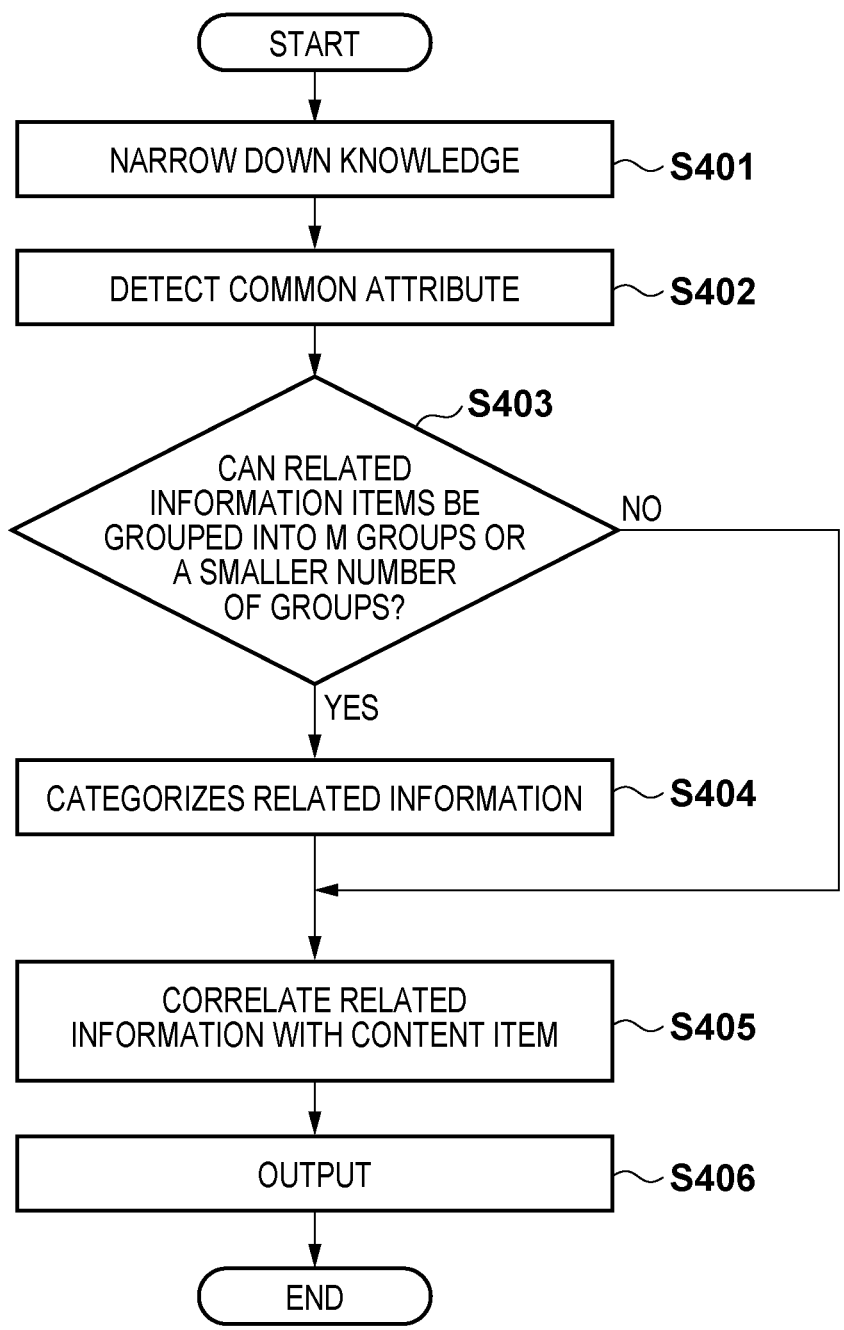
FIG. 4 is a flowchart illustrating processing for classifying the related information, according to Embodiment 1.

The flowchart in FIG. 4 illustrates the procedure for processing for categorizing and classifying the related information, and processing for correlating the related information with content items, in the present embodiment. This processing is performed after related information is acquired by the processing illustrated in FIG. 3. In step S401, the classification unit 208 narrows down the known knowledge so as to include the respective related information items. In the present embodiment, the hierarchical relation of knowledge is defined in the ontology database 203. The classification unit 208 can delete concepts that do not include the related information out of the concepts (classes) included in the hierarchical relation. In step S402, the classification unit 208 detects an attribute common to the related information items included in the respective concepts. Then, the classification unit 208 acquires the attribute value of the detected attribute for each related information item.

In step S403, the classification unit 208 determines whether the related information included in each concept can be grouped into a predetermined number of groups, according to the attribute values obtained in step S402. In the present embodiment, related information items having the same attribute value are grouped into one group. In the case where a plurality of common attributes are detected in step S402, it is also possible to determine the number of groups into which the related information items are grouped, for each attribute. If the number of groups exceeds a predetermined value (M) for all attributes, the processing proceeds to step S405. The processing proceeds to step S405 also when no common attribute has been detected in step S402. The processing proceeds to step S404 if the related information items can be grouped into M groups or a smaller number of groups.

In step S404, the classification unit 208 focuses on the attribute with which the related information items can be grouped into M groups or a smaller number of groups, and categorizes the related information items into groups. In step S405, the content correlating unit 209 obtains the relevance degree between the related information and the content item, and correlates the related information with the content item according to the relevance degree, as described above. In step S406, the output unit 210 outputs the plurality of the classified related information items, and the information correlating the related information with the content item. In the present embodiment, the output unit 210 outputs these to the document production support application 201.

There may be a case in which the related information obtained by the processing in FIG. 3 does not have a content item having a high relevance degree. In this case, the related information may not be correlated with a content item. The output unit 210 need not output the related information correlated with no content item. The related information and the content item may be correlated with each other asynchronously with categorization and classification of the related information. That is, the processing in step S405 and the processing from steps S401 to S404 may be performed in parallel.

Figure 8A:
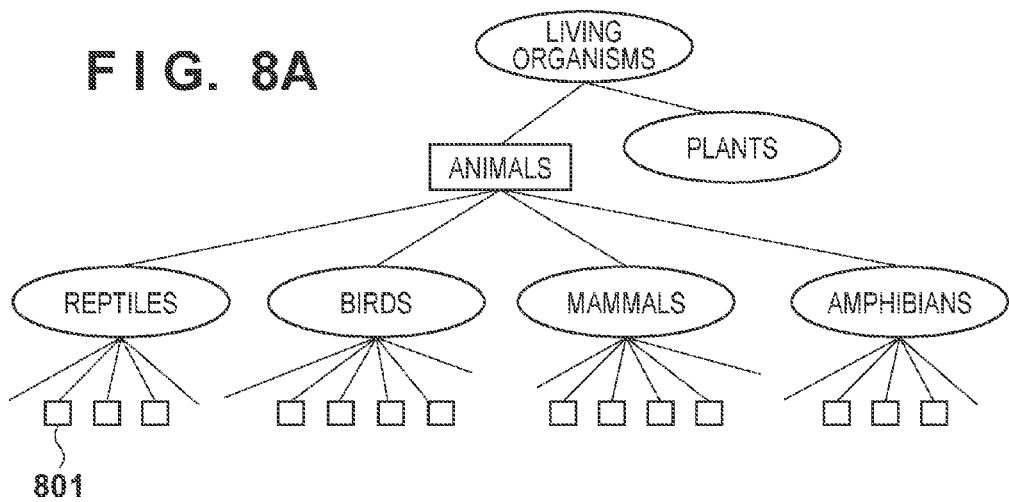
FIGS. 8A to 8C are diagrams illustrating a method for categorizing and classifying the related information according to Embodiment 1.
Figure 8B:
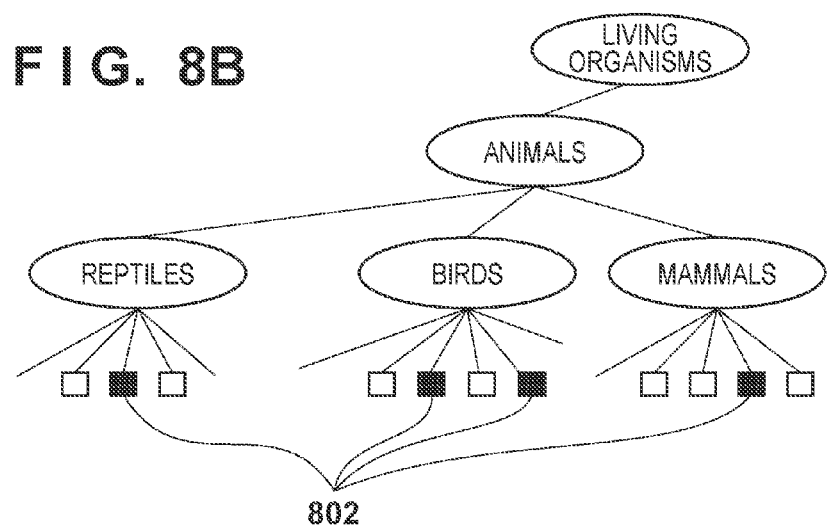
Figure 8C:
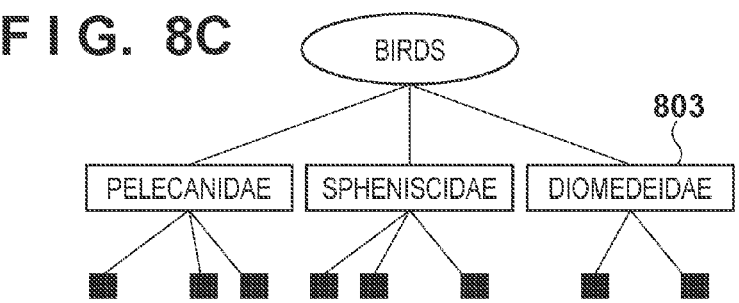

By performing processing according to the flowcharts shown in FIGS. 3 and 4, information narrowed down and classified as shown in FIGS. 8A to 8C, for example, can be obtained. For instance, assume that the hierarchical relation of knowledge in the field of living organisms as illustrated in FIG. 8A is defined in the known knowledge. In the knowledge of FIG. 8A, relations between concepts representing living organisms is illustrated. Also, in FIG. 8A, information (instance) of individual living organisms belonging to each concept is defined (801). For example, the instance 801 is "Galapagos tortoise". Here, it is assumed that the related information of "Galapagos tortoise" is retrieved under a search condition (802). In the present embodiment, the instance 802 includes "Galapagos albatross", "Galapagos penguin" and the like. In this case, as shown in FIG. 8B, the knowledge is narrowed down so as to include the retrieved related information. Also, in the knowledge of FIGS. 8A to 8C, "family" is defined as an attribute of the living organisms. In this case, as shown in FIG. 8C, the related information items are categorized and classified according to the attribute value of "family" (803).

In the present embodiment, it is possible to present content items that the user may need. For example, when the user has selected one of the blank fields in a document template to make an entry, content items that may be used for that field are retrieved, and may be presented in a semantically-classified state. Therefore, even when the user desires to obtain information in a field that the user is not familiar with, the user can efficiently retrieve such information.

In the present embodiment, three functions of the content categorizing system 202 have been described. That is, the presupposition information acquisition unit 205, the search condition generating unit 206 and the related information search unit 207 retrieve information from the known knowledge. The classification unit 208 categorizes the information. The content correlating unit 209 associates the information with content items. However, the content categorizing system 202 need not have all the functions. That is, conventional techniques can be used in place of each function.

For example, the related information that has been retrieved by using the information of interest and the related information according to the present embodiment may be output without being categorized, or may be categorized according to a conventional technique. In this case as well, the content categorizing system 202 can present content items that the user may need. Also, the content categorizing system 202 may categorize related information input from other systems according to the present embodiment. Also in this case, the content categorizing system 202 may present related information in a manner that facilitates search by the user. Further, the content categorizing system 202 may associate related information input from other systems with content items. Also in this case, the content categorizing system 202 can present content items that correspond to the related information.

Embodiment 2

In Embodiment 1, general-purpose knowledge is defined in the ontology database 203. However, knowledge about a specific field may be defined in the ontology database 203. Furthermore, knowledge of a plurality of fields may be defined in the ontology database 203, or a plurality of ontology databases 203 may be used. The knowledge defined in the ontology database 203 may be, for example, general-purpose knowledge, knowledge unique to a domain, knowledge common to a community, or knowledge specialized for the user. In addition, arbitrary combinations of these types of knowledge may be defined in the ontology database 203.

For example, in the specific example shown in Embodiment 1, knowledge of living organisms is used. The knowledge of living organisms may be defined as part of general-purpose knowledge, or defined independently as the knowledge of living organisms. Also, in Embodiment 1, an example is described in which a tour proposal is produced. Geographical knowledge, knowledge about time or the like, which may be used in this example, may be defined in the ontology database 203. Alternatively, knowledge for producing project proposals that is unique to the domain and is specialized for the operation for producing tour proposals may be defined in the ontology database 203.

In the case where knowledge of a plurality of fields is defined in the ontology database 203, the processing described in Embodiment 1 can be performed by using the knowledge of each field. For example, it is possible to retrieve related information from each field of knowledge, and classify the related information according to the field of knowledge. It is also possible to decide the priority for each field of knowledge. In this case, when a plurality of fields of knowledge is used, the order of retrieval processing can be decided according to the priority. In the case where the retrieval processing is performed in parallel for the fields, processing resources may be distributed according to the priority. Then, obtained related information may be output each time related information is obtained in the order of obtainment. The priority may be arbitrarily decided. For example, knowledge familiar to the user may be retrieved early, and general-purpose knowledge may be retrieved later. In this manner, it is possible to early output information and content items that are defined in the knowledge familiar to the user, to the user.

Embodiment 3

In Embodiment 1, when the search condition generating unit 206 adds a search condition, the superordinate concept of the "supplementary information" is used. However, another method can be used when adding a search condition. For example, a search condition that uses another relation between the information of interest and the supplementary information may be added. In the case where there is an information of interest a and a supplementary information b, in Embodiment 1, if the relation α that satisfies "a→relation α→b" cannot be found, the processing ends. However, the information a and the information b may be linked based on a plurality of relations. For example, the relation such as "a→relation γ→c→relation δ→b" may exist. If such information c, relation γ, and relation δ exist, it is possible to consider that the information a and the information b have a relation "relation γ→c→relation δ". Thus, it is also possible to retrieve related information by using this relation "relation γ→c→relation δ" and the supplementary information b.

Alternatively, "relation α" in the search condition may be changed to "relation α+", which has a similar meaning to "relation α". For example, in Embodiment 1, the information of interest and the supplementary information have the relation "habitat", but a relation such as "residence area", "construction area" or the like may be used as the search condition. Furthermore, in Embodiment 1, in the case where a plurality of search conditions are used, the logical conjunction of the retrieved information items is obtained as the related information. In this situation, the number of search conditions may be decreased in steps. In this manner, the number of the related information items can be increased. With the method described above, the number of obtained related information items can be increased. For example, it is possible to cause the number of the related information items to be equal to or exceed the predetermined number. Accordingly, the possibility that the related information that the user needs can be presented increases.

Embodiment 4

In Embodiment 1, in the case where a sufficient number of related information items cannot be obtained, a search condition is added. However, a search condition may be added when it is detected that the user does not have a sufficient number of related information items. For example, a search condition may be added when the user has instructed to add a search condition. The user can, for example, instruct the content categorizing system 202 to add a search condition via the document production support application 201.

The document production support application 201 may detect that the user does not have a sufficient number of related information items. For example, the document production support application 201 can detect that the user has not made an input for a predetermined time period after the related information has been presented to the user. In this case, the document production support application 201 can instruct the content categorizing system 202 to add a search condition.

Embodiment 5

In Embodiment 1, information items are categorized according to the attributes and the attribute values thereof. In the case where there are a plurality of attributes that are common to the information items, the information items can be categorized according to one of the attributes, which is selected from the plurality of attributes. At this time, the attribute may be selected in order to make the numbers of content items in the respective groups similar. Since there may be related information with which no content item is associated, in such a case, it is desirable that the related information is associated with content items in advance. Therefore, the processing in step S405 is desirably executed before the processing in step S403. Also, the user may select the attribute used for categorization. Furthermore, the content categorizing system 202 may select early an attribute that the user knows well, or often uses for categorization. This processing can be performed by referencing the personal information of the user, information relating to the documents that the user produced in the past, or the like.

Embodiment 6

In Embodiment 1, the search condition is generated according to the relation α between the information of interest a and the supplementary information b, which are included in the presupposition information. However, if the retrieval-target information is information x, the relation α between the supplementary information b and the information x may be acquired from the presupposition information. In the specific example of Embodiment 1, the supplementary information "Galapagos Islands" and the relation "habitat relation" may be acquired from the presupposition information. In this case, the search condition can be generated by using the supplementary information and the relation that have been obtained. In the present embodiment, it is not necessary to perform processing in order to extract the information of interest and the supplementary information from the presupposition information, and acquire the relation between the information of interest and the supplementary information, as was necessary in Embodiment 1. In the present embodiment, it is possible to generate a more appropriate search condition for obtaining related information that is useful for the user.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-195061, filed Aug. 31, 2010, which is hereby incorporated by reference herein in its entirety.

What is claimed is:

1. An information processing apparatus, comprising:
   a reception unit constructed to receive a first knowledge item and a second knowledge item, the second knowledge item being supplementary information of the first knowledge item;
   a storage unit constructed to store a knowledge database which has a plurality of knowledge items and a plurality of relation information items, the relation information items having attributes of relations between the knowledge items;
   a first query generation unit constructed to generate a first query for searching a relation information item in the knowledge database, wherein the relation information item has a first attribute of a relation between the first knowledge item and the second knowledge item in the knowledge database;
   a relation acquisition unit constructed to search the knowledge database for the relation information item using the first query generated by the first query generation unit;
   a second query generation unit constructed to generate a second query for searching a third knowledge item in the knowledge database, wherein an attribute of a relation between the second knowledge item and the third knowledge item is the same as the first attribute of the relation between the first knowledge item and the second knowledge item in the knowledge database, and the second knowledge item is supplementary information of the third knowledge item;
   a knowledge acquisition unit constructed to search the knowledge database for the third knowledge item using the second query generated by the second query generation unit; and
   an output unit constructed to output the third knowledge item searched by the knowledge acquisition unit.

2. An information processing apparatus according to claim 1, wherein said output unit is further constructed to, in a case where said knowledge acquisition unit has a plurality of third knowledge items, acquire relation information items having an attribute of a relation between the plurality of third knowledge items by referring to the knowledge database, and output the plurality of third knowledge items and the relation information.

3. An information processing apparatus according to claim 1, further comprising an expansion unit constructed to acquire, from the knowledge database, a fourth knowledge item that is indicated to be a generic concept to the second knowledge item by the knowledge database, in a case where said knowledge acquisition unit has searched one or more third knowledge items and the number of third knowledge items searched by said knowledge acquisition unit is less than a predetermined threshold value,
- wherein said relation acquisition unit is further constructed to additionally search the knowledge database for a relation information item having a second attribute of relation between the first knowledge item and the fourth knowledge item, and
- said knowledge acquisition unit is further constructed to additionally search the knowledge database for a fifth knowledge item, wherein an attribute of a relation between the fourth knowledge item and the fifth knowledge item is the same as the second attribute of the relation between the first knowledge item and the fourth knowledge item in the knowledge database, and the fourth knowledge item is supplementary information of the fifth knowledge item.

4. An information processing apparatus according to claim 1, wherein the output unit is further constructed to output the third knowledge item searched by said knowledge acquisition unit as a knowledge item similar to the first knowledge item, upon the reception unit receiving the first knowledge item and the second knowledge item.

5. An information processing apparatus according to claim 1, wherein said output unit is further constructed to, in a case where said knowledge acquisition unit has searched a plurality of third knowledge items, acquire relation information item having a relation between the plurality of third knowledge information items by using the knowledge database, and present the plurality of third knowledge items in a tree structure in accordance with the relation information item.

6. The information processing apparatus according to claim 1, wherein the first knowledge item is information of interest, and the second knowledge item is information related to the first knowledge item.

7. The information processing apparatus according to claim 1, wherein the second query is for searching the third knowledge item that has the same attribute as the first knowledge item.

8. The information processing apparatus according to claim 1, wherein said knowledge acquisition unit is further constructed to search for the third knowledge item which serves as an example of an information item that a user is trying to input after the user inputs the first knowledge item.

9. The information processing apparatus according to claim 1, wherein said relation acquisition unit is further constructed to search for a number of relation information items wherein the first knowledge item is related to the second knowledge item via the number of relation information items, and wherein said knowledge acquisition unit is further constructed to search for the third knowledge item which is related to the second knowledge item via the number of relation information items.

10. The information processing apparatus according to claim 1, wherein the relation indicated by the relation information item includes abstraction, concretization or equivalent relation.

11. The information processing apparatus according to claim 1, wherein the first, second and third knowledge items are terms.

12. The information processing apparatus according to claim 1, wherein the output unit is further constructed to output the third knowledge item selected by the knowledge acquisition unit to a user.

13. The information processing apparatus according to claim 1, further comprising a database selection unit constructed to select a knowledge database to be searched by the relation acquisition unit and the knowledge acquisition unit from a plurality of knowledge databases,
- wherein the storage unit is further constructed to store the plurality of knowledge databases, and
- wherein each of the plurality of knowledge databases defines knowledge in a specific field.

14. The information processing apparatus according to claim 1, further comprising an analysis unit constructed to analyze a document to derive the first knowledge item and the second knowledge item,
- wherein the first knowledge item relates to the second knowledge item,
- wherein the first knowledge item and a candidate knowledge item are a same type,
- wherein the candidate knowledge item works as a candidate to be inserted into the document, and
- wherein the output unit is further constructed to output the third knowledge item as the candidate knowledge item to be inserted into the document.

15. The information processing apparatus according to claim 1, wherein:
- the knowledge database has a tree structure, the knowledge item works as a node in the tree structure, and the relation information item works as a link between the knowledge items in the tree structure, and
- the knowledge database has a hierarchical structure, the first knowledge item and the third knowledge item are positioned in a first hierarchy, and the second knowledge item is positioned in a second hierarchy which is different from the first hierarchy.

16. The information processing apparatus according to claim 1, wherein the first and third knowledge items are instances of the second knowledge item.

17. An information processing method of an information processing apparatus, comprising the steps of:
- receiving a first knowledge item and a second knowledge item, the second knowledge item being supplementary information of the first knowledge item;
- storing in a storage unit a knowledge database which has a plurality of knowledge items and a plurality of relation information items, the relation information items having attributes of relations between the knowledge items;
- generating a first query for searching a relation information item in the knowledge database, wherein the relation information item has a first attribute of relation between the first knowledge item and the second knowledge item in the knowledge database;
- searching the knowledge database for the relation information item using the generated first query;
- generating a second query for searching a third knowledge item in the knowledge database, wherein an attribute of a relation between the second knowledge item and the third knowledge item is the same as the first attribute of the relation between the first knowledge item and the second knowledge item in the knowledge database, and the second knowledge item is supplementary information of the third knowledge item;

searching the knowledge database for the third knowledge item using the generated second query; and outputting the searched third knowledge item.

18. A non-transitory computer readable storage medium storing a program that, when executed by a processor, causes a computer to execute the method according to claim 17.

* * * * *